United States Patent
Küchler et al.

(10) Patent No.: US 10,530,529 B2
(45) Date of Patent: Jan. 7, 2020

(54) CARRIER RECOVERY SYSTEM AND METHOD

(71) Applicant: NXP B.V., Eindhoven (NL)

(72) Inventors: Wolfgang Küchler, Graz (AT); Ghiath Al-kadi, Graz (AT); Thomas Baier, Graz (AT); Jan Dutz, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/029,462

(22) Filed: Jul. 6, 2018

(65) Prior Publication Data

US 2019/0074930 A1    Mar. 7, 2019

(30) Foreign Application Priority Data

Sep. 5, 2017  (EP) .................................... 17189465

(51) Int. Cl.
- *H04L 1/00* (2006.01)
- *H04L 7/00* (2006.01)
- *H04L 5/00* (2006.01)

(52) U.S. Cl.
CPC .......... *H04L 1/0071* (2013.01); *H04L 1/0041* (2013.01); *H04L 1/0045* (2013.01); *H04L 5/0048* (2013.01); *H04L 7/0091* (2013.01)

(58) Field of Classification Search
CPC ... H04L 1/0071; H04L 1/0091; H04L 1/0041; H04L 1/0045; H04L 5/0048; H04L 7/0091
USPC ........................................................ 370/329
See application file for complete search history.

(56) References Cited

U.S. PATENT DOCUMENTS

| | | | |
|---|---|---|---|
| 2002/0101820 A1* | 8/2002 | Gupta | H04L 12/2801 370/229 |
| 2008/0043779 A1 | 2/2008 | Taha et al. | |
| 2010/0110979 A1* | 5/2010 | Chen | H04W 52/0225 370/328 |
| 2017/0359134 A1 | 12/2017 | Baier et al. | |
| 2018/0138993 A1* | 5/2018 | Kuchler | G01S 7/285 |
| 2018/0254923 A1 | 9/2018 | Dutz et al. | |
| 2018/0275268 A1* | 9/2018 | Reisinger | H04L 7/0008 |

FOREIGN PATENT DOCUMENTS

| | | |
|---|---|---|
| WO | 2007/053948 A1 | 5/2007 |
| WO | 2012/027700 A1 | 3/2012 |

OTHER PUBLICATIONS

Sahinoglu, Z. et al. "Ranging in the IEEE 802.15.4a Standard", 2006 IEEE Annual Wireless and Microwave Technology Conference, Clearwater Beach, FL, pp. 1-5. (2006)1.

"IEEE Standard for Low-Rate Wireless Networks—IEEE Std 802.15.4-2015 (Revision of IEEE Std 802.15.4-2011)", IEEE Standards Association, 708 pgs. (2015).

* cited by examiner

*Primary Examiner* — Faisal Choudhury
(74) *Attorney, Agent, or Firm* — Rajeev Madnawat (57) ABSTRACT

The disclosure relates to a processing module of a receiver device and associated method and apparatus. The method comprises receiving a signal comprising one or more frames, each frame comprising a synchronization-symbol-portion, a security-sequence-portion, and a data-payload-portion; and processing the signal to perform carrier recovery, and excluding at least part of the security-sequence-portions of the one or more frames from the carrier recovery process.

17 Claims, 7 Drawing Sheets

CARRIER RECOVERY SYSTEM AND METHOD

CROSS-REFERENCE TO RELATED APPLICATIONS

This application claims the priority under 35 U.S.C. § 119 of European Patent application no. 17189465.2, filed on Sep. 5, 2017, the contents of which are incorporated by reference herein.

The present disclosure relates to a processing module for a transmitter, a processing module for a receiver, an associated system and method in which frames comprising a synchronization-symbol-portion, a security-sequence-portion, and a data-payload-portion are processed. In particular, although not exclusively, the disclosure relates to Impulse Radio—Ultra-WideBand systems for ranging applications.

According to a first aspect of the present disclosure there is provided a processing module for a receiver device, the processing module configured to:

receive a signal comprising one or more frames, each frame comprising a synchronization-symbol-portion, a security-sequence-portion, and a data-payload-portion; and perform a carrier recovery process on the signal, wherein at least part of the security-sequence-portion of the one or more frames is excluded from the carrier recovery process.

Carrier recovery process may comprise a phase recovery process and/or a symbol synchronization process. A portion of the frame that is subjected to the carrier phase recovery may also be included in the symbol synchronization process. A portion of the frame that is excluded from the carrier phase recovery process may also be included in the symbol synchronization process.

A frame may also be referred to as a packet. Carrier recovery may be performed on the synchronization-symbol-portion of each frame. Carrier recovery may be performed on the data-payload-portion of each frame. The processing device may perform ranging on the recovered signal using the security-sequence-portion.

In one or more embodiments, the processing module is configured to determine whether the security-sequence-portion for each frame contains a known security-sequence or an unknown security-sequence. The processing module may be configured to include, for each frame comprising a known security-sequence, at least part of the known security-sequence-portion in the carrier recovery process. The processing module may be configured to perform carrier recovery using at least part of the known security-sequence-portion.

A known security-sequence may be a security sequence that is verifiable by the processing module of the receiver device by, for example, cross-correlating the security-sequence-portion with a target pattern. An unknown security-sequence may be a security sequence that is unverifiable by the processing module of the receiver device by, for example, cross-correlating the security-sequence-portion with a target pattern.

In one or more embodiments, unknown security-sequence-portions of each of the one or more frames are excluded from carrier recovery process. The processing module may be configured to exclude the unknown security-sequence-portion of each of the one or more frames from the carrier recovery process. The processing module may be configured to exclude the at least part of the unknown security-sequence-portion of each of the one or more frames from the carrier recovery process. The known security-sequence-portion of each of the one or more frames may be excluded from the carrier recovery process. The processing module may be configured to exclude the known security-sequence-portion of each of the one or more frames from the carrier recovery process. The processing module may be configured to exclude the at least part of the known security-sequence-portion of each of the one or more frames from the carrier recovery process. All security-sequence-portions of the one or more frames may be excluded from the carrier recovery process.

The processing module may be configured to inspect a data-payload-portion of a frame with a security-sequence-portion that is unknown to the processing module to obtain data. The processing module may be configured to use the obtained data to determine a target pattern for a security-sequence-portion of a subsequent frame. The processing module may be configured to perform ranging on the subsequent frame using a known security-sequence-portion of the frame.

The processing module may be configured to perform carrier recovery using a tracking loop, such as a phase-locked loop.

In one or more embodiments, the processing module is configured to exclude the at least part of the security-sequence-portion of the one or more frames from the carrier recovery process by pausing the carrier recovery process for a duration of the at least part of the security-sequence-portion.

In one or more embodiments, each frame comprises a plurality of synchronization-symbol-sub-portions that are interleaved with a plurality of security-sequence-sub-portions.

In one or more embodiments, the processing module has a priori knowledge of the format of the frames in the signal. The processing module may be configured to suspend carrier recovery in accordance with the frame format to prevent the security-sequence-portion being the subject of the carrier recovery process.

In one or more embodiments, the processing module of any preceding claim configured to perform carrier recovery using a dynamic-bandwidth-controlled tracking loop.

In one or more embodiments, the synchronization-symbol-portion precedes the security-sequence-portion in each frame. The processing module may be configured to reduce the bandwidth of the tracking loop as tracking progresses through the synchronization-symbol-portion. The synchronization-symbol-portion may precede the security-sequence-portion in each frame. The processing module may be configured to reduce the bandwidth of the tracking loop as tracking progresses through the synchronization-symbol-portion in order to reduce a residual error in the carrier recovery.

In one or more embodiments, the data-payload-portion follows the security-sequence-portion in each frame. The processing module may be configured to increase the bandwidth of the tracking loop following the security-sequence-portion.

In one or more embodiments, the data-payload-portion follows the security-sequence-portion in each frame. The processing module may be configured to increase the bandwidth of the tracking loop following the security-sequence-portion in order to reduce a settling time of the tracking loop when carrier recovery is resumed following the security-sequence-portion.

Also disclosed is a processing module for a transmitter device configured to communicate with a receiver device is also disclosed. The processing module may be configured to generate a signal comprising one or more frames. Each frame may comprise a synchronization-symbol-portion, a security-sequence-portion, and a data-payload-portion.

According to a further aspect there is provided a system comprising:
- at least one receiver device comprising the processing module according to any preceding claim; and
- at least one transmitter device comprising a transmitter processing module configured to communicate with the at least one receiver device, the transmitter processing module configured to generate a signal comprising one or more frames, each frame comprising a synchronization-symbol-portion, a security-sequence-portion, and a data-payload-portion.

A guard-time-interval may be provided before and/or after one or more of the plurality of synchronization-symbol-portions. The transmitter processing module may be configured to provide a guard time before and/or after one or more of the plurality of synchronization-symbol-portions.

In one or more embodiments, each frame includes a plurality of synchronization-symbol-portions. One or more of the synchronization-symbol-portions may be provided after the security-sequence-portion. Synchronization symbols may be provided within the data-payload-portion.

In one or more embodiments, the signal comprises a quadrature or higher order modulated symbol stream. The transmitter processing module may be configured modulate the security-sequence-portion with the synchronization-symbol-portion or the data-payload-portion.

In one or more embodiments, the receiver device and transmitter device are Impulse Radio—Ultra-WideBand, IR-UWB, devices.

In one or more embodiments, system comprises at least one of:
- an access control system for a building;
- a passive keyless entry and/or start system for an automobile;
- a contactless payment terminal; and
- an automatic teller machine.

According to a further aspect there is provided a method for operating a processing module of a receiver device, comprising:
- receiving a signal comprising one or more frames, each frame comprising a synchronization-symbol-portion, a security-sequence-portion, and a data-payload-portion; and
- processing the signal to perform carrier recovery, and excluding at least part of the security-sequence-portions of the one or more frames from the carrier recovery process.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

One or more embodiments will now be described by way of example only with reference to the accompanying drawings in which.

Wideband Radio Frequency (RF) applications have been developed that are capable of accurate distance measurement between two or more wireless devices. These measurements are based on Time-of-Flight (ToF) calculations which are derived by accurate determination of departure and arrival times of RF packets between two devices. RF packets travel at the speed of light and thus a calculated ToF allows determination of the distance between devices. Such a procedure is commonly called 'Ranging'. One practical application of Ranging is 'Distance Bounding' whereby ToF calculations are used to verify whether the distance between two devices is less than a predefined threshold, such as used for automotive Passive Keyless Entry (PKE) systems and other access control systems, as well as for contactless electronic payment systems.

A receiving device is able to derive a channel estimate in relation to a transmitting device using known patterns within a received packet from the transmitting device. For example, in IR-UWB (Impulse Radio—Ultra-WideBand) systems, such as defined in IEEE 802.15.4, a preamble comprising repeating synchronization symbols and a Start-of-Frame Delimiter (SFD) is placed in front of a payload segment. In IR-UWB receivers, the repeating synchronization symbols within the preamble of a received packet are typically used to realise time and frequency synchronization and to derive a channel estimate for the received packet. A channel estimate consists of an estimate of arrival times of multipath components, the first arrived multipath component represents the shortest radio path and is therefore important for the ToF calculations.

Examples herein are described with reference to a radio frequency (RF) communication device e.g. transmitter device and a receiver device and the processing modules thereof. However, it is contemplated that examples are not limited to being implemented solely within RF communication devices and examples may be applicable to any system in which ToF measurements are required to be determined, and in particular applicable to any system in which a Time-of-Flight (ToF) distance measurement is a specified function, such as IR-UWB (Impulse Radio—Ultra WideBand) radio frequency (RF) transceivers, pulse radars at 60 GHz and higher frequencies, and pulse-based light/laser ranging transceivers. Thus it is contemplated that examples may be implemented within a range of different communication systems including, but not limited to, RF communication systems, and optical (e.g. light/laser) communication systems, etc. The applications may range from automotive Passive Keyless Entry (PKE) systems and other access control systems to (contactless) electronic payment systems, and in particular to any application where ranging and distance bounding is performed.

In IR-UWB RF systems, it may be desirable to maximize security and link budget while minimizing current consumption, latency, and system cost.

The IR-UWB physical layer is defined in IEEE Standards Association, IEEE Standard for Low-Rate Wireless Personal Area Networks (WPANs), IEEE Std 802.15.4™-2015 (hereinafter "IEEE standard"). The specification of the physical layers in the standard may have drawbacks for particular use cases. However, we describe herein a plurality of aspects of the physical layer specification that may provide one or more technical effects for one or more particular use cases. One or more of the aspects herein may provide a technical effect over what is disclosed in the standard, for particular use cases.

Accordingly, one or more of the aspects described herein are described as changes to or improvements on the IR-UWB physical layer IEEE standard and accordingly terms and concepts used herein may be equivalent to terms used and concepts defined in the IEEE standard. Additionally, processes or definitions of the IEEE standard may be combined with the features defined herein.

Figure 1:
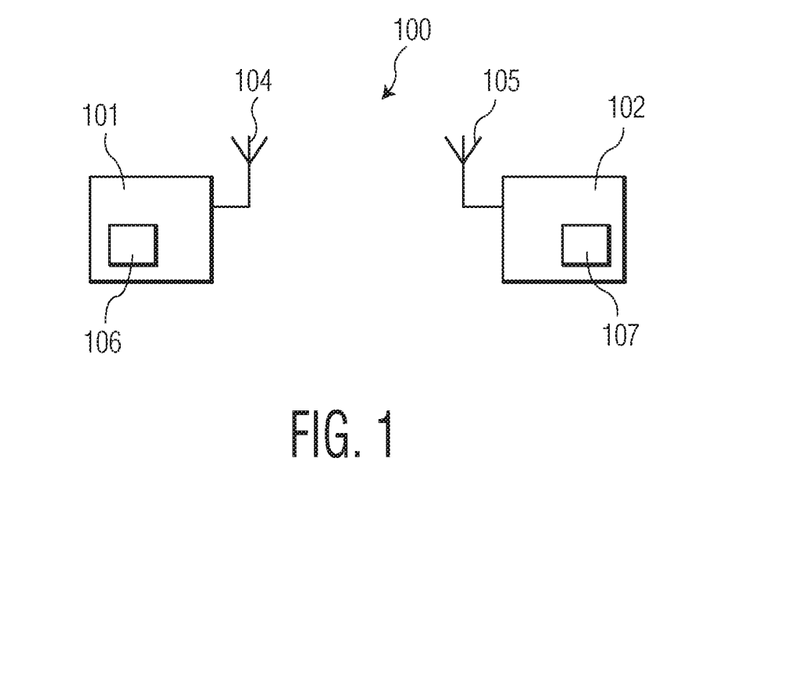
FIG. 1 shows a schematic block diagram of a system comprising a transmitter device and a receiver device.

FIG. 1 illustrates a schematic block diagram of a system 100 comprising at least one transmitter device 101 and at least one receiver device 102. The at least one transmitter device 101 and the at least one receiver device 102 each comprise a respective antenna 104, 105 for signal communication and a respective processing module 106, 107 that may be implemented by computer logic to perform digital signal processing.

The system 100 may comprise Impulse Radio—Ultra-WideBand, IR-UWB, devices to provide:
  an access control system for a building;
  a passive keyless entry and/or start system for an automobile;
  a contactless payment terminal system; or
  an automatic teller machine system.

The processing modules 106, 107 of the transmitter 101 and receiver 102 are configured to exchange data packets, or frames, and determine time of flight-information associated with the frames in a conventional manner. In this way, the interactions can exchange data to (i) enable ranging and (ii) transfer other information.

In passive keyless entry applications, or other ranging applications, it is typical for a system to be used in an environment where multiple other systems operate using a similar channel. For example, a number of vehicles may be parked together in a car park, each vehicle looking for its own key. In order to avoid conflict between systems, each system transmission may contain a unique identifier. The unique identifier may be encrypted in each transmission to avoid a third party snooping on a user by tracking a unique identifier associated with the user.

To ensure that the ranging is performed in a secure way, for example to prevent Cicada attacks, a target pattern in each transmitted frame may be generated as a security-sequence, or secure training sequence (STS), using a Cryptographically Secure Pseudo Random Number Generator (CSPRNG). Security is achieved by ensuring that the sequence is only known by the sender and the intended recipients.

Figure 2:
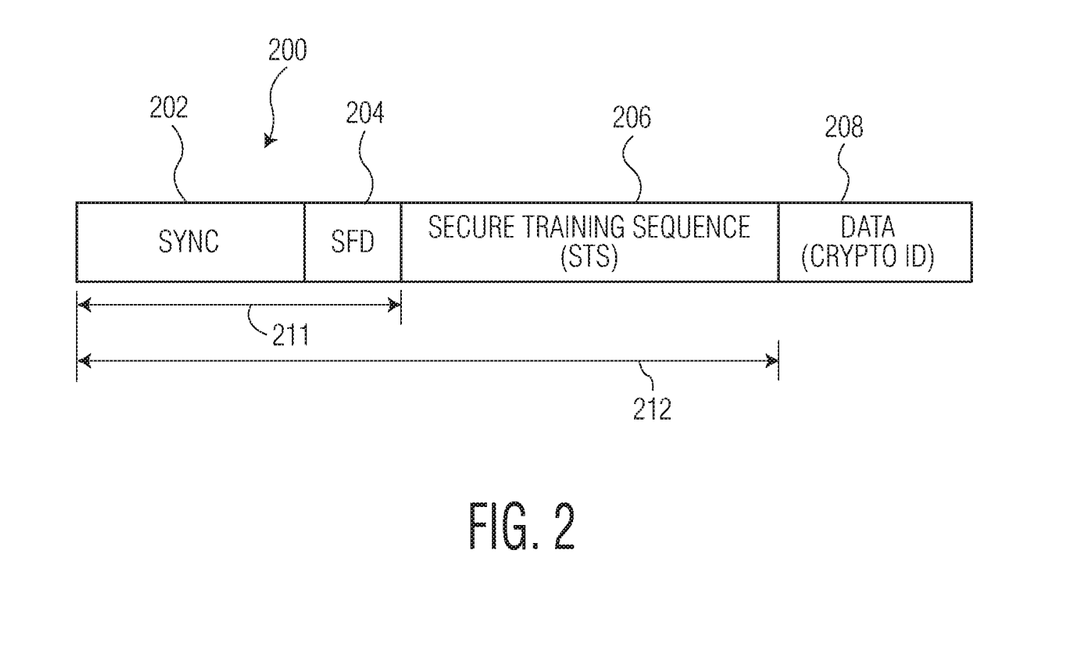
FIG. 2 shows a frame for use in the system of FIG. 1.

FIG. 2 illustrates a block diagram representation of a frame 200. The frame 200 may be used for ranging or transmitting data between a tag and an anchor.

The frame 200 comprises sequential data structures including a synchronization-symbol-portion 202, a start-frame-delimiter (SFD) 204, a security-sequence-portion 206 and a data-payload-portion 208. The security-sequence-portion 206 provides a secure training sequence (STS). The synchronization-symbol-portion 202 may contain a plurality of repeating, predetermined synchronization symbols. The synchronization-symbol-portion 202 and subsequent start-frame-delimiter 204 provide a synchronization header (SHR) 211 in a conventional manner. The synchronization header 211 and subsequent secure training sequence (STS) may be considered to provide a secure preamble 212 that can be used to identify the frame and perform ranging.

The STS used by a transmitter and receiver may be synchronized using a shared secret, such as a public encryption key. One shared secret can be used to derive a set of STS sequences by employing a certain algorithm, such as a cryptographic algorithm which may be used with a range of seed values. In a ranging protocol, an intended recipient may have knowledge of the shared secret and the algorithm, but not which STS of the set has been transferred.

For example, the secure training sequence (STS) of the frame 200 is a cryptographically secure pseudo random number that may be provided by a cryptographically secure pseudo random number generator (CSPRNG) of the transmitter. The cryptographically secure pseudo random number may be generated using known encryption methodology. Use of the STS enables the receiver to verify the authenticity of the transmitter by comparing the STS that is received with a reference pattern. The comparison may be performed by a correlator that generates the reference value, or expected STS, based on an encryption key and a security-sequence-counter-value (seed value).

The receiving transceiver must know the current security-sequence-counter-value (seed value) in order to determine the expected security-sequence to compare with the received security-sequence. Therefore, for secure ranging via IR-UWB prior knowledge of an expected sequence is needed.

The data-payload-portion 208 can be used to notify the recipient which STS has been used or which STS sequences are going to be used next. This may be achieved by providing the security-sequence-counter-value, or an encrypted copy of the security-sequence-counter-value, in the data-payload-portion 208. A receiver can then use this information to determine which STS is going to be sent next, and perform ranging at the next opportunity.

In order to obtain processable data in a coherent receiver, carrier recovery and symbol synchronization is performed on the received signal in order to achieve channel synchronization. Carrier recovery and symbol synchronization may involve phase recovery and timing synchronization, as is known in the art, and may be implemented using well known schemes such as phase-locked loops to track the evolution of a signal with time.

A problem that has been identified is that the receiver tracking loops cannot operate effectively on an unknown STS, resulting in a degradation of carrier recover so that any payload sent after an STS cannot be received reliably.

Tracking loops operate by comparing an input signal to a reference signal. The tracking loop adjusts the phase and the sampling rate such that the difference is minimized. One example is the operation of the tracking loop for the duration of an a priory known STS sequence.

The tracking loops need to be active during data reception. Since the data is unknown to the receiver, it has to estimate a reference signal. This is commonly done by utilizing hard decisions of the demodulated data. A minimum signal to noise ratio is required such that the tracking loop can operate reliably. In IR-UWB or spread-spectrum systems, each data bit is spread over multiple chips. The receiver accumulates the chips, that correspond to a bit, before it performs a hard decision. This process is called de-spreading. It increases the signal to noise ratio substantially and enables the operation of the tracking loop on unknown data.

The purpose of the STS sequence is to enable secure ranging. An attacker shall not be able to inject a STS or part of an STS ahead of time, and thereby artificially shortening the ranging result. It is hence very important that the STS consists of a sequence of pulses that appear random to the attacker. An a priori known spreading code cannot be used, since it would allow the attacker to perform a so called early-detect-late-commit attack on the spreading code. The attacker would then use the first part of the spreading sequence to detect the polarity of the sequence, send the remainder ahead of time and thereby artificially shorten the ranging result of a genuine receiver. Spreading can thus not be used for the STS. Operating tracking loop on the individual STS pulses would dramatically degrade sensitivity of the system, making it unpractical for an actual application.

Tracking loops (in a phase-locked loop, PLL, for example) can track the signal continuously which would cause a random drift of the carrier during an unknown STS, since the carrier cannot be recovered on symbol level without knowing the spreading sequence, leading to degradation of carrier recovery performance. This degradation may cause the loss of signal lock such that the ability to receive the data-payload-portion following an unknown STS may be lost. Although such lost data-payload-portions are associated with frames that cannot be verified to enable secure ranging (because the STS in the frame is unknown at the receiver), these data-payload-portions may still contain useful information, such as security-sequence-counter-value (seed value) information to enable the recognition of the STS in a subsequent frame. It would therefore be advantageous to recover such lost data-payload-portions.

In order to improve carrier recovery and so enable recovery and processing of data-payload-portions in frames with an unknown STS, the processing module of an example receiver is configured to exclude unknown security-sequence-portions from the carrier recovery process. A portion is excluded from processing in that processing is not performed on that portion. This may be achieved by pausing the signal tracking process in the time domain so that the security-sequence-portion of a frame is not the subject of the carrier recovery process. A conventional carrier recovery process may be controlled in accordance with a recovery process status in order to achieve exclusion of the security-sequence-portions. A data-payload-portion with unknown data may still be tracked because its spreading is known. By demodulation after despreading of each data-payload-portion symbol it is possible to recover the carrier with a relatively high signal-to-noise ratio.

Figure 11:
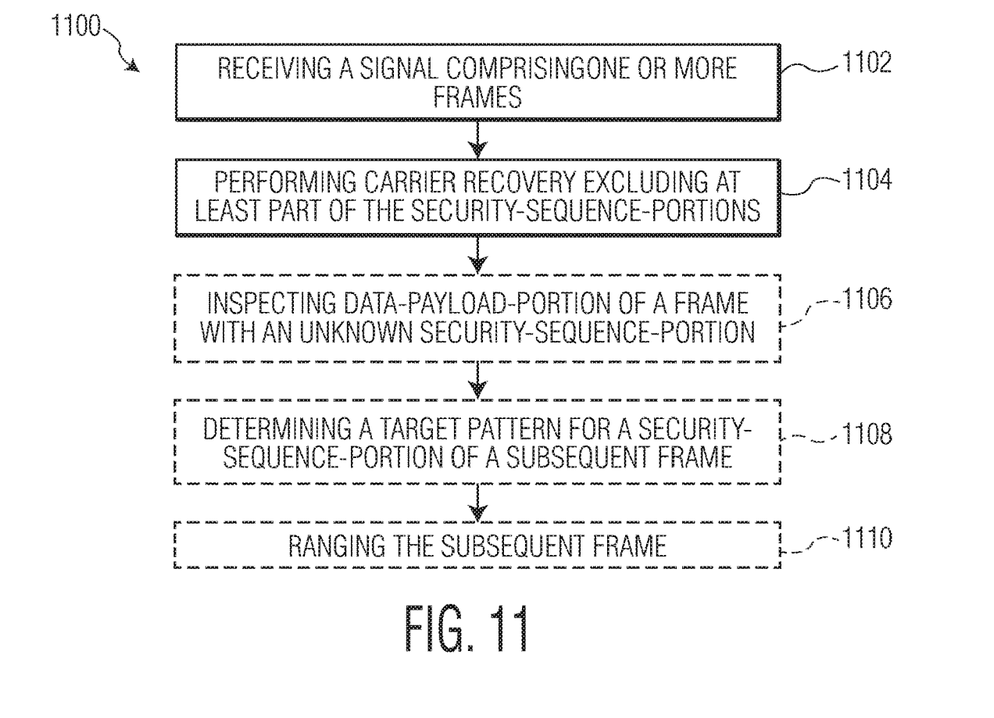
FIG. 11 shows a method for operating a processing module for a receiver device.

Turning to FIG. 11, there is illustrated an example of a method 1100 for operating a processing module of a receiver device. The method comprises:
 receiving 1102 a signal comprising one or more frames, each frame comprising a synchronization-symbol-portion, a security-sequence-portion, and a data-payload-portion; and
 performing carrier recovery 1104 on the signal, wherein at least part of the security-sequence-portion of the one or more frames is excluded from the carrier recovery. A data-payload-portion of a frame with a security-sequence-portion that is unknown to the processing module of the receiver device may be inspected 1106 to obtain data. The obtained data may be used to determine 1108 a target pattern for a security-sequence-portion of a subsequent frame. Ranging 1110 may be performed on the subsequent frame using a known security-sequence-portion of the frame.

Various example physical layer frame structures and associated carrier-recovery-status-signals and methods for use in a processing module are discussed below with reference to FIGS. 3 to 10.

The processing module of the receiver device may have a priori knowledge of the format of the frames in the signal and may be configured to suspend, or pause, carrier recovery in accordance with the expected frame format to prevent the security-sequence-portion of the frames being the subject of the carrier recovery process.

Figure 3A:
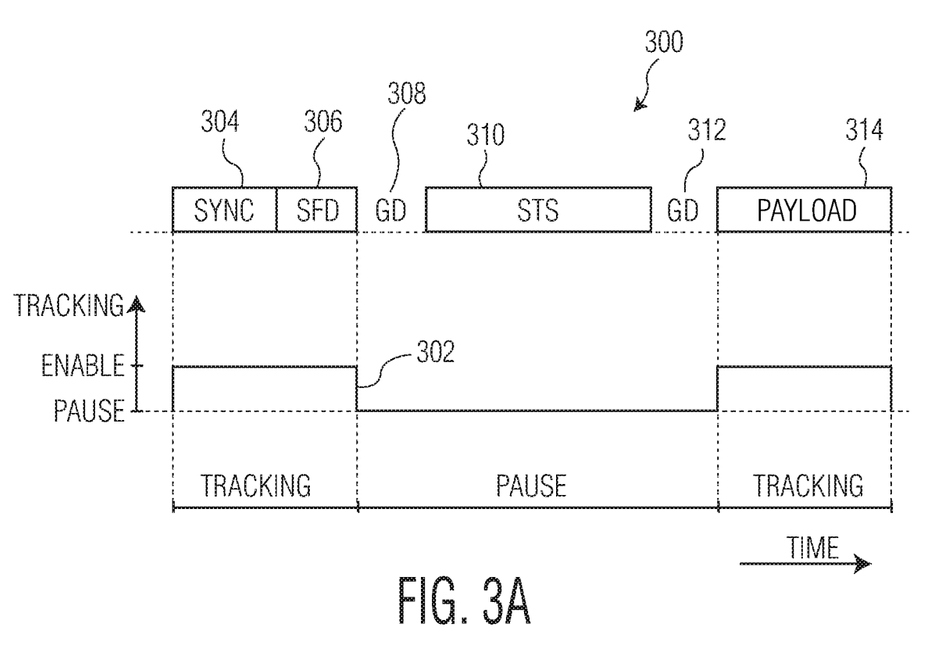
FIG. 3a shows a frame and an associated carrier-recovery-status-signal in which carrier recovery is paused for a security-sequence portion.

FIG. 3a shows a schematic block diagram of a frame 300, which may also be referred to as a data packet, and a timing diagram for a carrier-recovery-status-signal 302. The frame 300 comprises a synchronization-symbol-portion 304 followed by a start-frame-delimiter 306. Following the start-frame-delimiter 306, there is provided a sequence comprising an optional first guard-interval 308, a security-sequence-portion 310, an optional second guard-interval 312 and a data-payload-portion 314.

The carrier-recovery-status-signal 302 indicates whether a carrier recovery function of the processing module of the receiver device is enabled or paused for a corresponding portion of the frame 300. During a paused period, the tracking of the carrier recovery process remains in a steady state and does not change in response to changes in the underlying signal. Carrier recovery is enabled during the synchronization-symbol-portion 304 and the start-frame-delimiter 306. The carrier recovery process may transition to being paused at the beginning of, during, or at the end of the first guard-interval that precedes the security-sequence-portion 310 and may be reenabled at the beginning of, during, or at the end of the second guard-interval 312. Once resumed, the carrier recovery process remains enabled during the data-payload-portion 314.

In this way, all security-sequence-portions, including both known and unknown security-sequence-portions, can be excluded from carrier recovery processing for ease of implementation. Portions other than the security-sequence portion, and possibly all other portions, are included in the carrier recovery process.

The processing module of the receiver device may be configured to verify whether the security-sequence-portion for each frame contains a known security-sequence by, for example, cross-correlating the security-sequence-portion 310 of the frame 300 with a target pattern. In such examples, the processing module may be configured to include at least part of the known security-sequence-portions of the one or more frames in the carrier recovery and exclude at least part of the unknown security-sequence-portions of the one or more frames from the carrier recovery process. That is, in some examples, only unknown security-sequence-portions of the one or more frames are entirely excluded from the carrier recovery process.

Figure 3B:
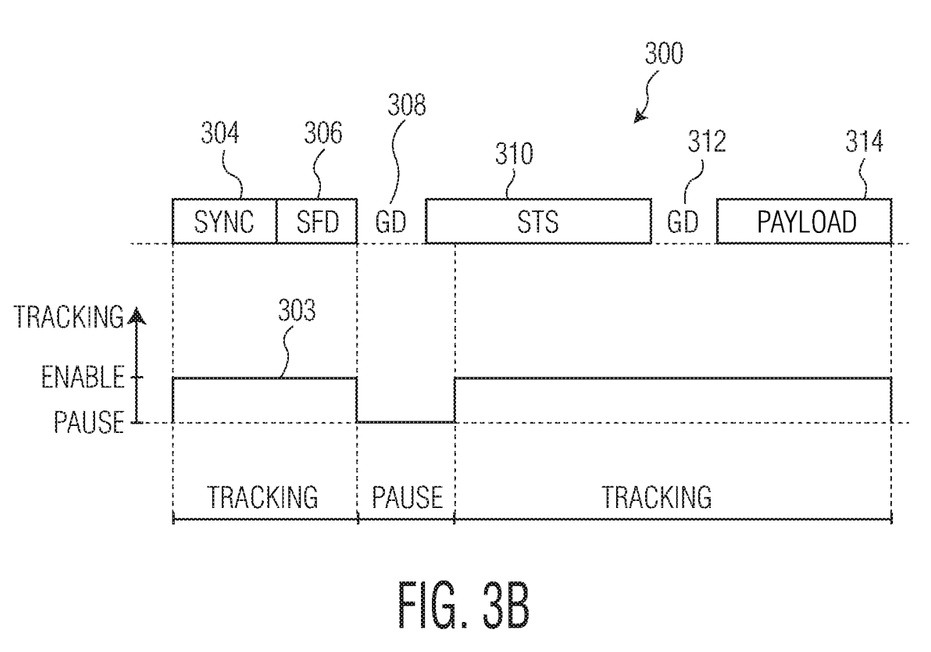
FIG. 3b shows a frame and an associated carrier-recovery-status-signal in which carrier recovery is reenabled during a known security-sequence portion.

FIG. 3b also shows the frame 300 described previously with reference to FIG. 3a and a modified carrier-recovery-status-signal 303. In this example, the carrier recovery process is reenabled by the processing module in response to determining that the security-sequence-portion at least partially matches a target pattern.

Cross-correlation of the security-sequence-portion 310 of the frame 300 with a target pattern starts at the beginning of the security-sequence-portion 310. If, after a predetermined number of symbols, the security-sequence-portion 310 is consistent with the target pattern then the carrier recovery process may be reenabled during the security-sequence-portion 310, as shown in FIG. 3b. Alternatively, if the security-sequence-portion 310 is found not to match the target pattern then the carrier recovery process is reenabled after the security-sequence-portion 310 has finished, as described previously with reference to FIG. 3a. That is, if the security-sequence-portion 310 is found not to match the target pattern then the carrier recovery process remains disabled throughout the security-sequence-portion 310.

In this way, unknown security-sequence-portions (portions that contain an unknown security sequence) are excluded from carrier recovery while known security-sequence-portions (portions that contain a known security sequence) are included in carrier recovery. The suspension of carrier recovery may therefore be reduced or even minimised by excluding only security-sequence-portions that relate to unknown security sequences, which may perturb the tracking process of the carrier recovery, while operating on security-sequence-portions that contain a known security sequence, which do not perturb tracking in the carrier recovery process.

Figure 4:
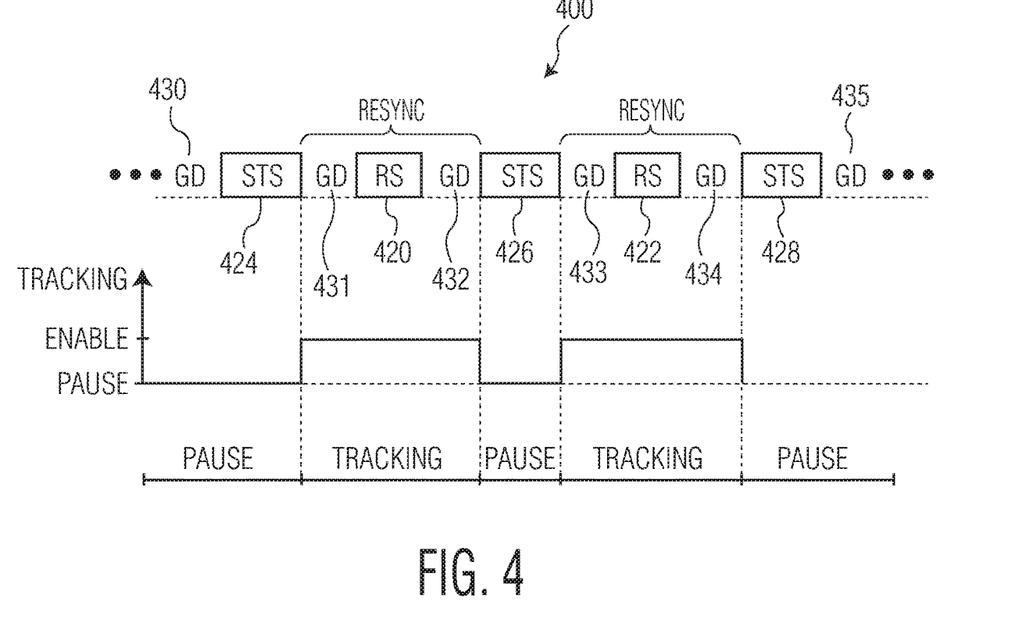
FIG. 4 shows a frame with resynchronization portions and an associated carrier-recovery-status-signal.

FIG. 4 shows a portion of a frame 400 and a corresponding carrier-recovery-status-signal 402. The portion of the frame 400 is provided after a start-frame-delimiter (not shown). The portion of the frame 400 comprises a plurality of synchronization-symbol-portions 420, 422 and a plurality of security-sequence-portions 424, 426, 428. The synchronization-symbol-portions 420, 422 may be referred to as resynchronization portions because they are provided within the frame in order to resynchronise the carrier recovery process following a pause due to the provision of a security-sequence-portion 424, 426. The synchronization-symbol-portions 420, 422 are therefore interleaved with the security-sequence-portions 424, 426, 428. Respective optional guard-intervals 430-435 are provided between the security-sequence-portions 424, 426, 428 and the synchronization-symbol-portions 420, 422.

The specific example of the format of the portion of the frame 400 shown in FIG. 4 comprises, sequentially: a first guard-interval 430, a first security-sequence-portion 424, a second guard-interval 431, a first synchronization-symbol-portions 420, a third guard-interval 432, a second security-sequence-portion 426, a fourth guard-interval 433, a second synchronization-symbol-portion 422, a fifth guard-interval 434, a third security-sequence-portion 428 and a sixth guard-interval 435.

The carrier-recovery-status-signal 402 is enabled during the synchronization-symbol-portions 420, 422 and paused during the security-sequence-portions 424, 426, 428. Reenabling of the carrier-recovery-status-signal 402 may occur at the beginning of, during or at the end of an optional guard-interval 431, 433 that immediately follows a security-sequence-portion 424, 426. Also, reenabling may occur during a security-sequence-portion if the security-sequence-portion is determined to be known, as described previously with reference to FIG. 3b. The pausing of the carrier-recovery-status-signal 402 may occur at the beginning of, during, or at the end of a guard-interval 432, 434 that immediately precedes a security-sequence-portion 426, 428.

Figure 5:
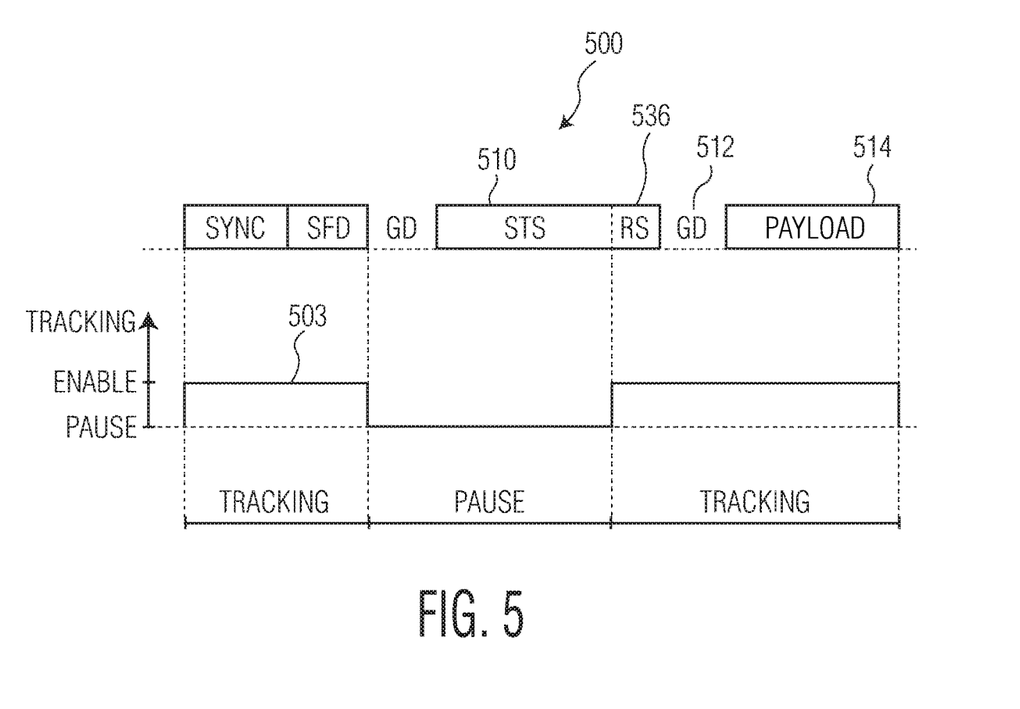
FIG. 5 shows a frame with a resynchronization portion immediately following a security-sequence-portion and an associated carrier-recovery-status-signal.

FIG. 5 illustrates a frame 500 and a corresponding carrier-recovery-status-signal 502. The frame 500 is similar to that described previously with reference to FIG. 3a or 3b except that a synchronization-symbol-portion 536 is provided immediately following the security-sequence-portion 510, before a guard-interval 512 and a data-payload-portion 514. Corresponding reference numerals are used between FIGS. 3a, 3b and 5 to describe like features. The carrier-recovery-status-signal 502 is reenabled following the security-sequence-portion 510 and at the beginning of, or during, the synchronization-symbol-portion 536. The synchronization-symbol-portion 536 in this example may also be considered to provide resynchronization for the frame because the synchronization portion 536 is provided in the same frame as, but following, the security-sequence-portion 510.

Figure 6:
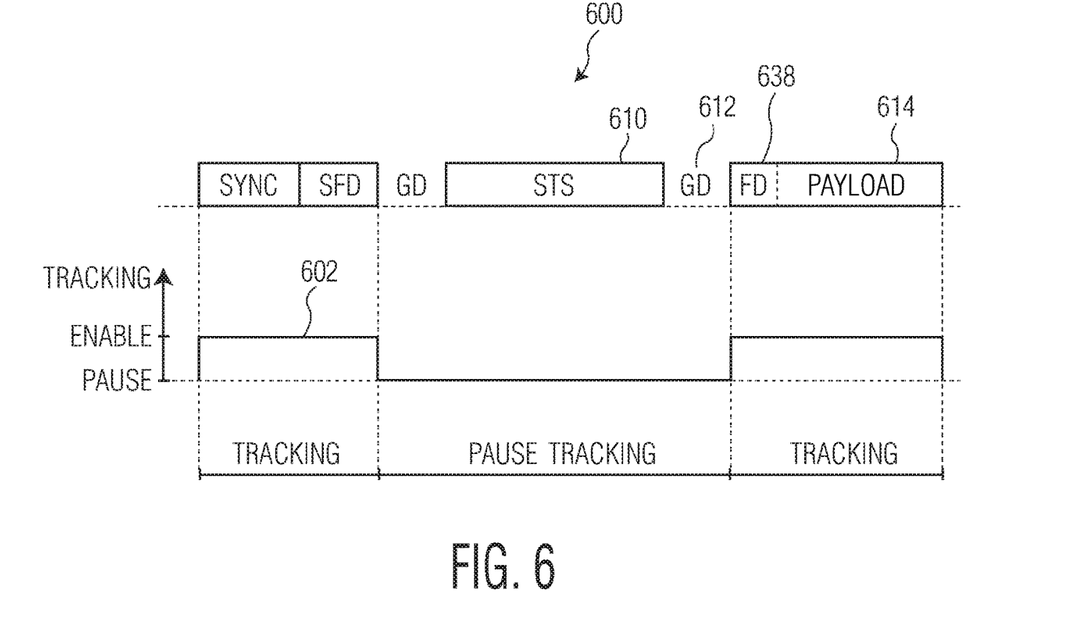
FIG. 6 shows a frame with a fixed data portion following a security-sequence-portion and an associated carrier-recovery-status-signal.

FIG. 6 illustrates a frame 600 and a corresponding carrier-recovery-status-signal 602. The frame 600 is similar to that described previously with reference to FIG. 3a or 3b except that a fixed data portion 638 is provided following the security-sequence-portion 610. In this example, the fixed data portion 638 is provided as part of the data-payload-portion 614. The fixed data portion 638 is separated from the security-sequence-portion 610 by an optional guard-interval 612. The fixed data portion 638 also acts as a resynchronization-symbol-portion and contains a priori known data that can be used by a processing module in a receiver device to resynchronize tracking of the carrier recovery process.

The carrier-recovery-status-signal 602 is reenabled at the beginning of, during, or at the end of the guard-interval before the fixed data portion 638 so that the carrier recovery process can act on the fixed data portion 638.

In some examples, a quadrature or higher order modulation scheme (such as quadrature phase shift keying) may be used to modulate a pilot signal or the data-payload-portion onto the security-sequence-portion. The pilot signal may be provided by synchronization-symbols, which are a priori known by the receiver.

Figure 7:
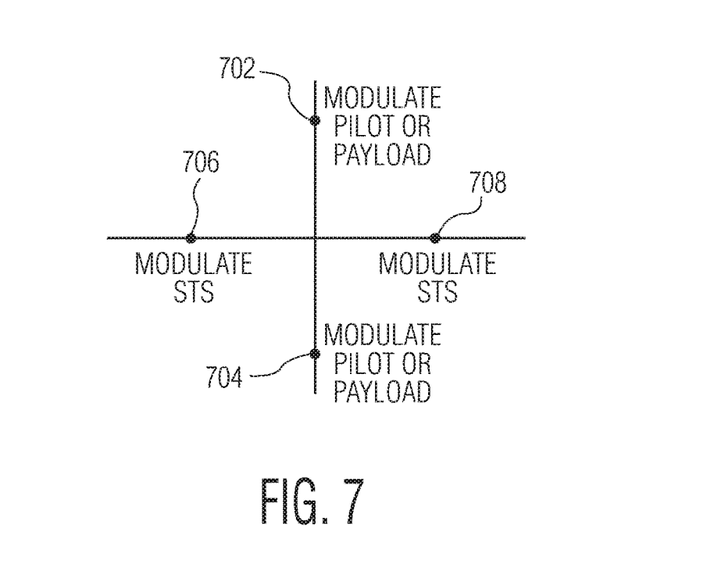
FIG. 7 shows a modulation scheme for communicating a security-sequence-portion simultaneously with other data.

FIG. 7 illustrates a constellation diagram for a quadrature modulation scheme. The scheme has a first state 702 and an alternative second state 704 for representing a pilot signal or payload data provided in a first dimension (quadrature in this example) and a third state 706 and an alternative fourth state 708 for representing the secure training sequence in an orthogonal, second dimension (in-phase in this example). In this way, the security-sequence-portion and (i) data-payload-portion or (ii) synchronization-symbol-portion of a frame may be received simultaneously. In such examples, the carrier recovery process is not paused as such, but the security-sequence-portion may be excluded from the carrier recovery process while the carrier recovery process is allowed to act on the data-payload-portion or synchronization-symbol-portion by performing the carrier recover process only on the second dimension of the signal.

Figure 8:
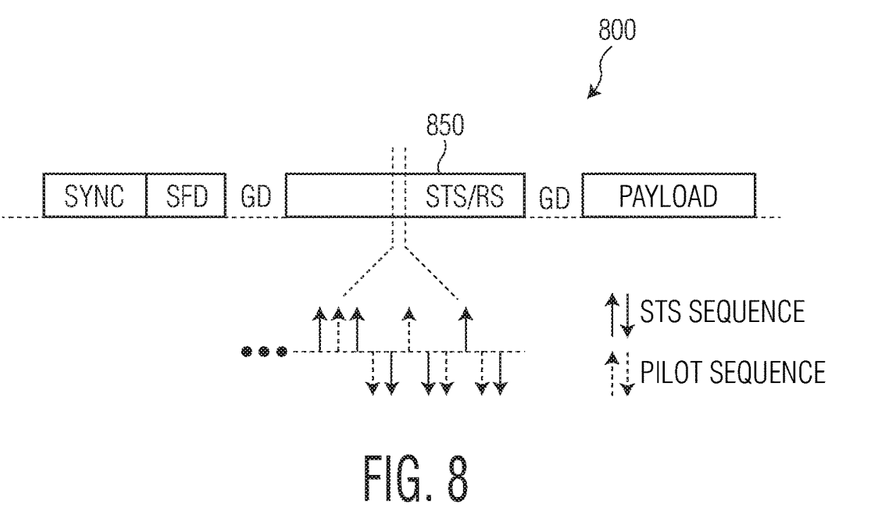
FIG. 8 shows a frame with an interleaved portion comprising a security-sequence and synchronization-sequence.

FIG. 8 illustrates another frame 800 which is similar to that described previously with reference to FIG. 3a except that the frame 800 comprises a plurality of synchronisation-symbol-sub-portions that are interleaved with a plurality of security-sequence-sub-portions in an interleaved security-sequence/synchronisation-symbol portion 850, instead of a security-sequence-portion. The interleaved security-sequence/synchronisation-symbol portion 850 contains (re-)synchronisation symbols and security sequence symbols distributed in a predetermined arrangement. In this example, a single synchronisation symbol is provided between each of the security sequence symbols.

The synchronisation-symbols, or pilot symbols, can be separated from the security-sequence-symbols by a processing module of the receiver device if the processing module has access to the predetermined sequence with which the synchronisation symbols are distributed within the interleaved portion 850. The processing module may therefore use this a priori knowledge in order to exclude the security sequence symbols from carrier recovery processing whilst including the synchronisation symbols.

In some examples, the processing module of the receiver may be further configured to modify the bandwidth of the carrier recovery process using, for example, a dynamic-bandwidth-controller tracking loop.

Figure 12:
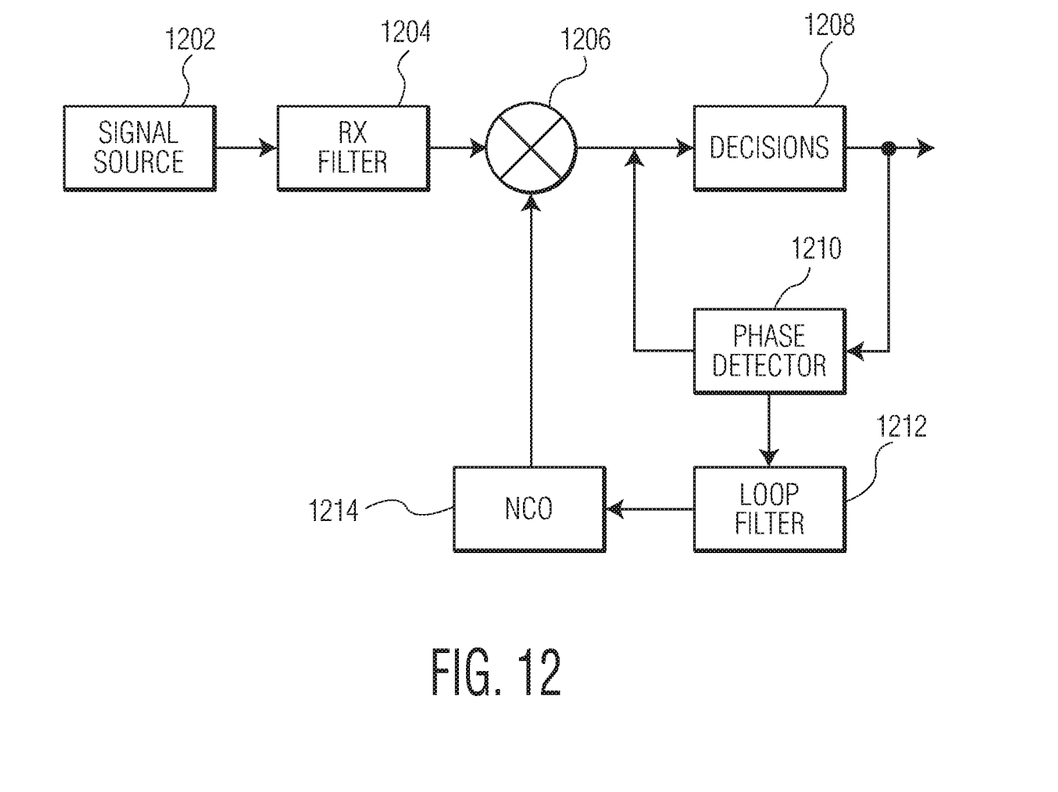
FIG. 12 shows a schematic block diagram of a tracking loop for carrier phase recovery.

Turning to FIG. 12, a tracking loop for carrier phase recovery is illustrated. A signal source 1202 is fed to an RF mixer 1206 via a receiver filter 1204. A symbol correlator may be provided in the receiver filter 1204 to de-spread the received symbols.

In the tracking loop, an output of the mixer 1206 is fed to a decision block 1208. The decision block 1208 may, for example, demodulate/decode a symbol (e.g. decides if a symbol was '0' or '1'). For example, for a binary phase shift keyed (BPSK) carrier recovery it is necessary to know if a 180° phase error is present on the carrier or if the modulated symbol shifts the carrier by 180°. If the modulated symbol has rotated the carrier, then the decision block 1208 may first de-rotate the symbol before feeding it to the error detector.

A phase detector 1210 receives the output of the mixer 1206 and the output of the decision block 1208 as its inputs and provides a phase difference at its output. The output of the phase detector is fed back as a second input to the mixer 1206 via a loop filter 1212 and a numerically controller oscillator 1214. A dynamic bandwidth controller tracking loop may be implemented by adopting the bandwidth of the loop filter 1212 during phase tracking.

Figure 9:
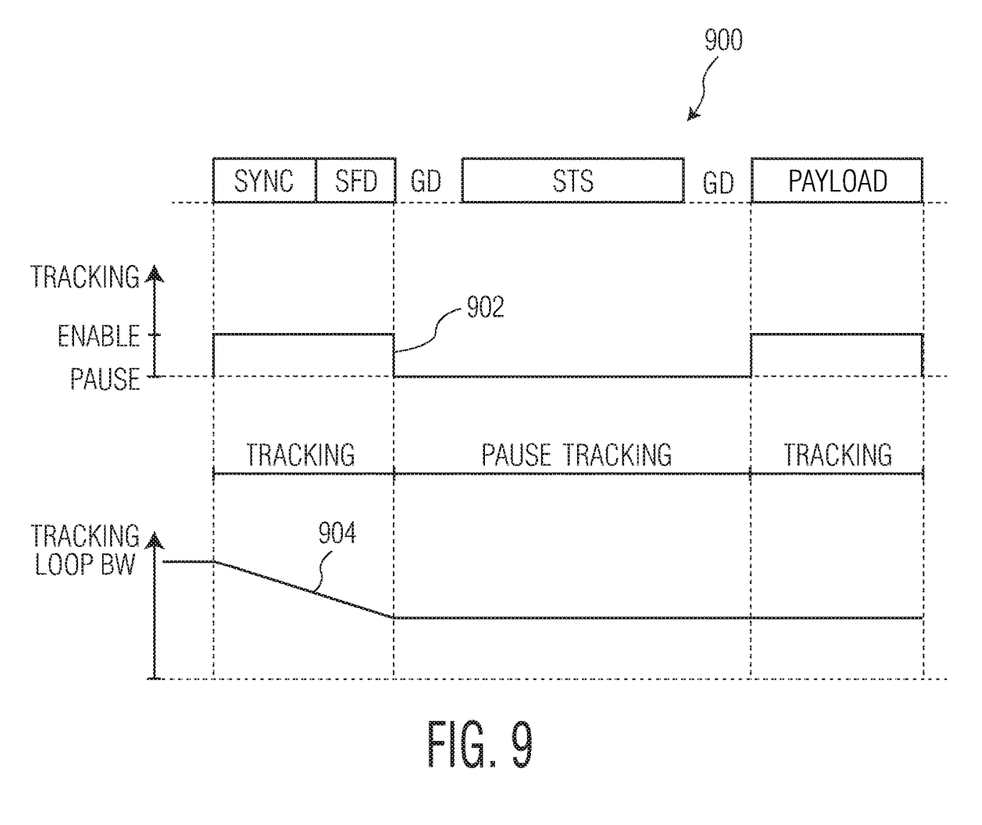
FIG. 9 shows a frame, a carrier-recovery-status-signal and an associated carrier recovery loop bandwidth level.

FIG. 9 shows a frame 900 and carrier recovery status signal 902 that are similar to those described previously with reference to FIG. 3a. In addition, FIG. 9 shows a plot of a tracking loop bandwidth 904 for a dynamic-bandwidth-controlled tracking loop. The tracking loop bandwidth 904 is gradually reduced as tracking progresses through the synchronisation-symbol-portion and start frame delimiter at the beginning of the frame in order to reduce a residual error in the carrier recovery process. After tracking has been paused, prior to the beginning of the security-sequence-portion, the bandwidth 904 remains constant for the remainder of the processing of the current frame. The bandwidth of the tracking loop 904 may be increased subsequent to the processing of the current frame and before carrier recovery processing of a subsequent frame.

Figure 10:
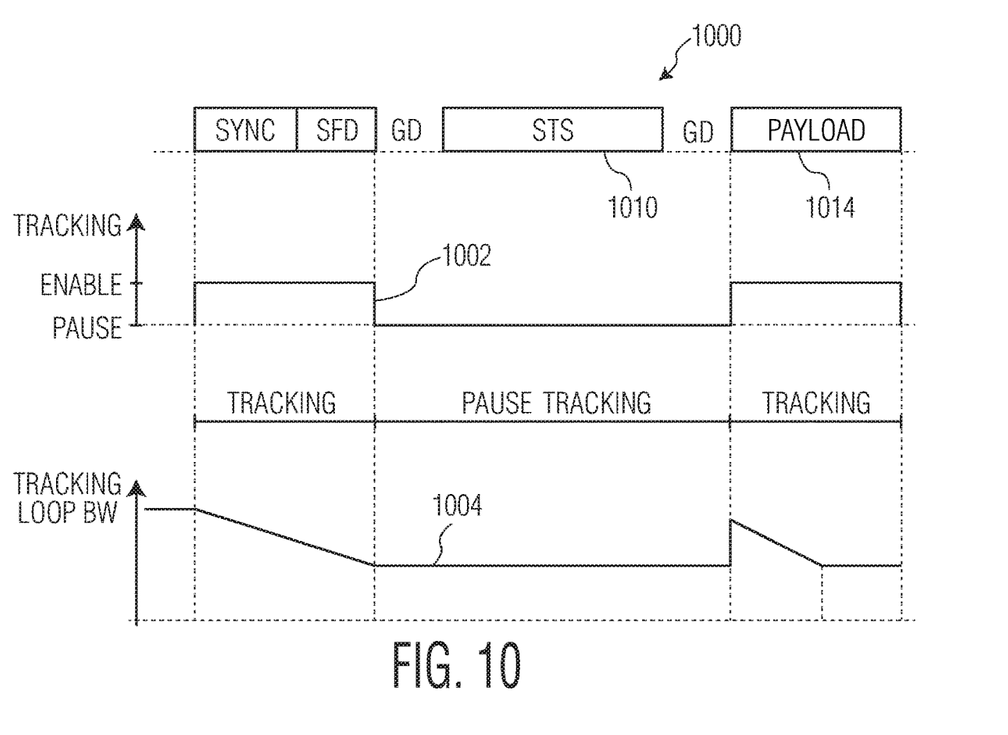
FIG. 10 shows a frame, a carrier-recovery-status-signal and another associated carrier recovery loop bandwidth level.

FIG. 10 illustrates a frame 1000, carrier recovery status signal 1002 and an associated profile for the tracking loop bandwidth 1004 similar to those described previously with reference to FIG. 9, except that the tracking loop bandwidth 1004 is increased during the processing of the frame 1000. Specifically, the tracking loop bandwidth 1004 is increased following the security-sequence-portion, at the beginning of, or in advance of, the payload-data-portion 1014. The increase in the tracking loop bandwidth 1004 coincides with the recommencing of tracking for the carrier recovery status signal 1002. Increasing the tracking loop bandwidth 1004 in this way results in a reduction in the settling time of the tracking loop following resumption of tracking within the current frame. The increase in bandwidth is asymptotic in this example. Following the increase in the tracking loop bandwidth 1004, the tracking loop bandwidth 1004 may be gradually reduced at a similar rate to that seen in the example of FIG. 9. In this example, the tracking loop bandwidth 1004 is reduced to be the same level that it was before the increase in the tracking loop bandwidth 1004.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microprocessors, processor modules or subsystems (including one or more microprocessors or microprocessors), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microprocessor, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A receiver comprising:
a processor; and
a memory that stores executable instructions that, when executed by the processor, facilitate performance of operations, comprising:
receiving a signal comprising one or more frames, each frame comprising a synchronization-symbol-portion, a security-sequence-portion with both a known security-sequence and an unknown security-sequence, and a data-payload-portion;
inspecting a data-payload-portion of a frame with the unknown security-sequence to obtain data;
using the obtained data to determine a target pattern for a security-sequence-portion of a subsequent frame;
performing ranging on the subsequent frame using the known security-sequence of the frame; and
performing a carrier recovery process on the signal, wherein at least part of the known security-sequence is included in the carrier recovery process and the unknown security-sequence is excluded from the carrier recovery process.

2. The receiver of claim 1, wherein the receiver is further configured to exclude the unknown security-sequence by pausing the carrier recovery process for a duration of the unknown security-sequence.

3. The receiver of claim 1, wherein each frame comprises a plurality of synchronization-symbol-sub-portions that are interleaved with a plurality of security-sequence-sub-portions.

4. The receiver of claim 1, wherein the receiver has a priori knowledge of the format of the frames in the signal and is configured to suspend carrier recovery in accordance with the frame format to exclude the unknown security-sequence from the carrier recovery process.

5. The receiver of claim 1, wherein the carrier recovery process comprises carrier phase recovery.

6. The receiver of claim 5, wherein the receiver is further configured to perform carrier recovery using a tracking loop.

7. The receiver of claim 6, wherein the receiver is further configured to perform carrier recovery using a dynamic-bandwidth-controlled tracking loop.

8. The receiver of claim 7, wherein the synchronization-symbol-portion precedes the security-sequence-portion in each frame, and the receiver is further configured to reduce the bandwidth of the tracking loop as tracking progresses through the synchronization-symbol-portion.

9. The receiver of claim 7, wherein the data-payload-portion follows the security-sequence-portion in each frame, and the receiver is further configured to increase the bandwidth of the tracking loop following the security-sequence-portion.

10. The receiver of claim 1, wherein the receiver is further configured to perform the carrier recovery process on the data-payload-portion of each frame.

11. The receiver of claim 1, wherein a known security-sequence is a security sequence that is verifiable by the receiver by cross-correlating the security-sequence-portion with a target pattern, and the unknown security-sequence is a security sequence that is unverifiable by the receiver by cross-correlating the security-sequence-portion with a target pattern.

12. A system comprising:
at least one receiver device configured to:
receive a signal comprising one or more frames, each frame comprising a synchronization-symbol-portion, a security-sequence-portion with both a known security-sequence and an unknown security-sequence, and a data-payload-portion,
inspect a data-payload-portion of a frame with the unknown security-sequence to obtain data,
use the obtained data to determine a target pattern for a security-sequence-portion of a subsequent frame,
perform ranging on the subsequent frame using the known security-sequence of the frame, and
perform a carrier recovery process on the signal, wherein at least part of the known security-sequence is included in the carrier recovery process and the unknown security-sequence is excluded from the carrier recovery process; and
at least one transmitter device configured to communicate with the at least one receiver device, generate a signal comprising one or more frames, each frame comprising a synchronization-symbol-portion, a security-sequence-portion with both a known security-sequence and an unknown security-sequence, and a data-payload-portion, wherein at least part of the known security-sequence is included in a carrier recovery process and the unknown security-sequence is excluded from the carrier recovery process.

13. The system of claim 12, wherein each frame includes a plurality of synchronization-symbol-portions, one or more of the synchronization-symbol-portions are provided after the security-sequence-portion, and synchronization symbols are provided within the data-payload-portion.

14. The system of claim 12, wherein the signal comprises a quadrature or higher order modulated symbol stream and the at least one transmitter device is configured to modulate the security-sequence-portion with the synchronization-symbol-portion or the data-payload-portion.

15. The system of claim 12, wherein the at least one receiver device and the at least one transmitter device are Impulse Radio Ultra-WideBand (IR-UWB) devices.

16. The system of claim 12, wherein the system comprises at least one of:
an access control system for a building;
a passive keyless entry and/or start system for an automobile;
a contactless payment terminal; and
an automatic teller machine.

17. A method for operating a receiver device, the method comprising:
receiving a signal comprising one or more frames, each frame comprising a synchronization-symbol-portion, a security-sequence-portion with both a known security-sequence and an unknown security-sequence, and a data-payload-portion;
inspecting a data-payload-portion of a frame with the unknown security-sequence to obtain data;
using the obtained data to determine a target pattern for a security-sequence-portion of a subsequent frame;
performing ranging on the subsequent frame using the known security-sequence of the frame; and
processing the signal to perform carrier recovery, wherein at least part of the known security-sequence is included in the carrier recovery process and the unknown security-sequence is excluded from the carrier recovery process.

* * * * *